United States Patent [19]

Pirovano et al.

[11] 4,116,574
[45] Sep. 26, 1978

[54] CABLE TERMINALS FOR METAL CABLES

[76] Inventors: Camillo Pirovano, Via Spluga, Cernusco Lombardone (Como), Italy

[21] Appl. No.: 835,694

[22] Filed: Sep. 22, 1977

[30] Foreign Application Priority Data

Oct. 7, 1976 [IT] Italy .............................. 28074 A/76

[51] Int. Cl.² ............................................. F16G 11/05
[52] U.S. Cl. ...................................... 403/275; 403/248
[58] Field of Search ............... 403/275, 277, 280, 281, 403/248, 251, 215, 216; 29/461

[56] References Cited

U.S. PATENT DOCUMENTS

| | | | |
|---|---|---|---|
| 1,381,779 | 6/1921 | Williams | 403/275 |
| 1,466,127 | 8/1923 | Gottschalt | 403/248 |
| 1,484,202 | 2/1924 | Baker | 403/248 |

FOREIGN PATENT DOCUMENTS

| | | | |
|---|---|---|---|
| 2,253,609 | 7/1975 | France | 403/248 |
| 656,242 | 12/1928 | France | 403/215 |

Primary Examiner—Andrew V. Kundrat
Attorney, Agent, or Firm—Stevens, Davis, Miller & Mosher

[57] ABSTRACT

An improved cable terminal structure is disclosed which comprises the combination of a tapered bushing receiving the outside surface of the belled-out cable strands and a tapered screw placed centrally of the strand mass so as to engage the strands solidly with the bushing. When two such combined structures are coupled together with the aid of an appropriate ferrule, the problem of splicing two cable section can also be solved, that which cannot be made with the conventional cable terminals.

4 Claims, 2 Drawing Figures

U.S. Patent  Sept. 26, 1978  4,116,574
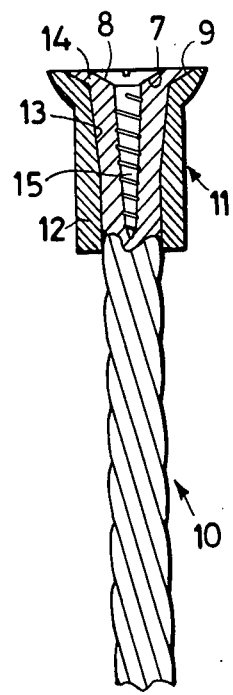
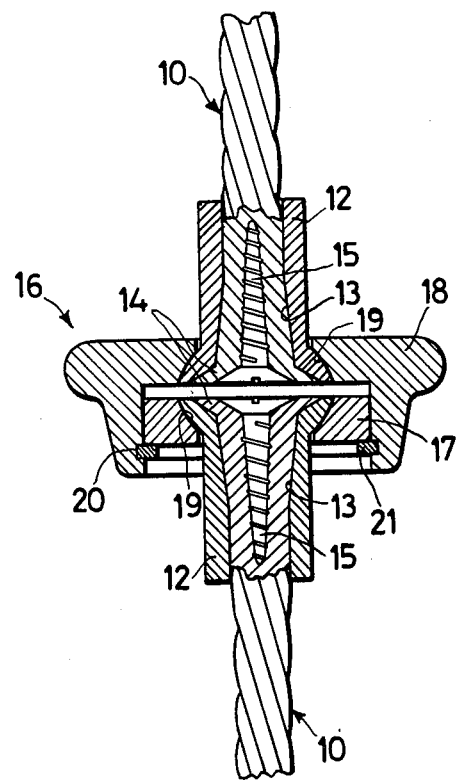

CABLE TERMINALS FOR METAL CABLES

This invention relates to a type of cable terminal for metal cables.

In connecting together metal cables of the type used for supporting the ducted or canalised scraper elements of conveyor lines for pulverulent or granular materials, the two ends of the cables to be joined must each comprise a bush with a generally conical head. The two heads are connected together by means of a joint comprising facing seats of conical form complementary thereto.

As the cable fixing is entrusted in the majority of cases only to said bushes, there must be fixed firmly to the cable ends so as to form a single piece therewith.

Various methods are known for obtaining this fixing. For example, the end strands of the cable are widened apart at the conical region of the bush after this has been mounted on the cable. Molten metal is then cast into this preformed cavity.

In this manner, when the metal solidifies, a compact cable-bush block is obtained, of which the metal itself forms the binder.

However, this method is clearly lengthy and costly.

In a second method, instead of casting metal, a wedge is forced between the unwound strands, which in this manner become rigidly clamped between the bush and wedge.

This second method is much simpler, but less reliable in that as a result of the repeated traction stresses exerted on the cable, the wedge tends to withdraw from its seat, so releasing the strands from the bush.

The object of the present invention is to provide a cable terminal which is safe from any load or fatigue stress and may be constructed simply by a low-cost operation.

This object is attained according to the invention by a cable terminal for metal cables, wherein a cylindrical bush flared at one end is mounted and locked on the cable, the cable strands are unwound inside the bush and a self-tapping screw is screwed between said strands in a direction axial to the bush for a depth not exceeding that of the bush, said screw having a head flared to correspond substantially to the flaring of the bush.

A cable terminal according to the invention is described hereinafter by way of non-limiting example, with reference to the accompanying drawings in which:

FIG. 1 is a partially sectional view of the cable terminal, and

FIG. 2 shows a method of application of this latter to the connection of two cables.

The device according to the invention is fitted to the end of a metal cable indicated overall by 10. A bush 11, cylindrical at 12, slightly conical at 13 and flared at 9 is mounted and locked on the end of the cable 10, which has a diameter generally equal to the inner diameter of the cylindrical part 12.

The terminal portion of the strands 14 is unwound at the bush 11, and a self-tapping screw 15 of a shorter length than the bush 11 and comprising a head 8 flared at 7 is forcibly screwed into this unwound portion.

FIG. 2 shows one application of these cable terminals, in which the two cables 10 constrained to the respective bushes 11 by the screws 15 are joined together by a joint 16, the couplings 17 and 18 of which each comprises internal seats 19 for coupling to the respective bushes, the outer coupling 18 comprising a further internal seat 20 for containing a retention ring 21 which prevents the two cable terminals from sliding axially in the withdrawal direction.

In this manner a very compact bush-cable assembly is obtained, in that the screw 15 may be forcibly screwed to the point where the unwound strands themselves excavate a small seat inside the bush 11, which is usually of copper or a material of similar behaviour. The flared head of the screw 15, which presses on the strands 14 at the flaring 9 of the bush 11, and the thread of the screw which produces friction on the strands 14, further contribute to making the bush-cable coupling resistant to any traction stress, when supported by the joint 16. The only limitation is that the screw 15 must not be longer than the bush, to prevent the portion external thereto from unwinding, with consequent unwinding of the entire cable 10.

An advantageous embodiment comprises the use of a screw 15 having a pitch different from that of the cable 10, in order to completely resist any separation between the components.

The cylindrical part 12 serves for keeping the cable 10 guided when in a state of flexion, the slightly conical part serves for opening the cable 10 during its locking, and the flared part 13 serves for bending the opened strands outwards, these strands thus becoming reliably locked against any withdrawal by the action of the head 8 of the screw 15, which is flared in a corresponding manner.

FIG. 2 shows how this embodiment enables the two cable terminals to be easily coupled together, their ends being smooth because of the externally flat head of the screws 15 and thus free from any metal burrs or danger of withdrawal, as in the case of wedges the projecting heads of which repeatedly strike each other to finally cause the couplings 17 and 18 of the joint 16 to separate from each other.

Finally, it is apparent that this embodiment is of low cost and short manufacturing time.

Modifications may be made to this preferred embodiment of the invention, without leaving its scope as heretofore described and illustrated with reference to the accompanying drawings.

What we claim is:

1. A cable terminal for metal cables, comprising a bush having an internally cylindrical bore flared internally at one end with an internal slightly conical part between the cylindrical part and the flared end, said bush mounted and locked on the cable, the cable strands are unwound inside the bush and a self-tapping screw is screwed between said strands in a direction axial to the bush for a depth not exceeding that of the bush, said screw having a head flared to correspond substantially to the flaring of the bush.

2. A cable terminal as claimed in claim 1, wherein the length of the screw is at most equal to the length of the bush.

3. A cable terminal as claimed in claim 1, wherein the screw has a pitch different from the winding pitch of the cable.

4. A cable terminal as claimed in claim 1, wherein said bush is of copper or a material of similar behaviour.

* * * * *